United States Patent [19]

Pokorny et al.

[11] Patent Number: 4,621,340
[45] Date of Patent: Nov. 4, 1986

[54] METHOD FOR CONSTRUCTION AND DISPLAY OF IDEOGRAPHIC CHARACTERS

[75] Inventors: Cornel Pokorny, Accum; Peter Tillich, Wilhelmshaven, both of Fed. Rep. of Germany

[73] Assignee: Olympia Werke AG, Wilhelmshaven, Fed. Rep. of Germany

[21] Appl. No.: 412,798

[22] Filed: Aug. 27, 1982

[30] Foreign Application Priority Data

Aug. 29, 1981 [DE] Fed. Rep. of Germany ....... 3134282

[51] Int. Cl.⁴ ..................... G06F 12/08; G06F 15/62; G06F 3/14
[52] U.S. Cl. .................................. 364/900; 400/110; 340/731; 340/751
[58] Field of Search ................ 340/731, 751; 400/110, 400/121; 364/200, 900

[56] References Cited

U.S. PATENT DOCUMENTS

| | | | |
|---|---|---|---|
| 4,181,973 | 1/1980 | Tseng | 364/900 |
| 4,228,507 | 10/1980 | Leban | 340/751 |
| 4,408,199 | 10/1983 | White et al. | 340/751 |
| 4,428,065 | 11/1984 | Duvall et al. | 340/731 |
| 4,435,703 | 3/1984 | Hunt et al. | 340/731 |
| 4,490,789 | 12/1984 | Leban et al. | 340/751 |
| 4,511,267 | 4/1985 | Pokorny et al. | 340/731 |

FOREIGN PATENT DOCUMENTS

1398882 6/1975 United Kingdom .

OTHER PUBLICATIONS

Ming Wen Du et al, "The Chiao-Tung Radical System, Part II: Character Composition and Methods to Represent Radicals"; Computer Science Department National Chiao-Tung University, Hsinchu, Taiwan, R.O.C., pp. 63-78.

*Primary Examiner*—Eddie P. Chan
*Attorney, Agent, or Firm*—Spencer & Frank

[57] ABSTRACT

A method for constructing ideographic characters by means of a character generator and displaying such characters within a standard character area of a display device coupled to the character generator. The method includes storing data in the character generator corresponding to (a) character components used for forming the ideographic characters, (b) information regarding the position within the standard character area of the character components associated with each ideographic character and (c) information regarding the size of the ones of the character components associated with each ideographic character. A character code is fed into the character generator to identify the ideographic character to be displayed and display control signals are emitted in accordance with the stored data relating to the ideographic character identified by the character code fed-in for displaying the associated character components arranged in the standard character area of the display device according to the stored position and size information.

19 Claims, 6 Drawing Figures

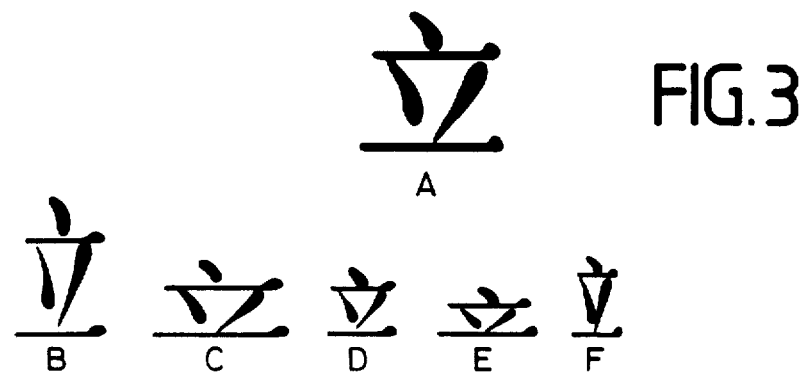
FIG. 3
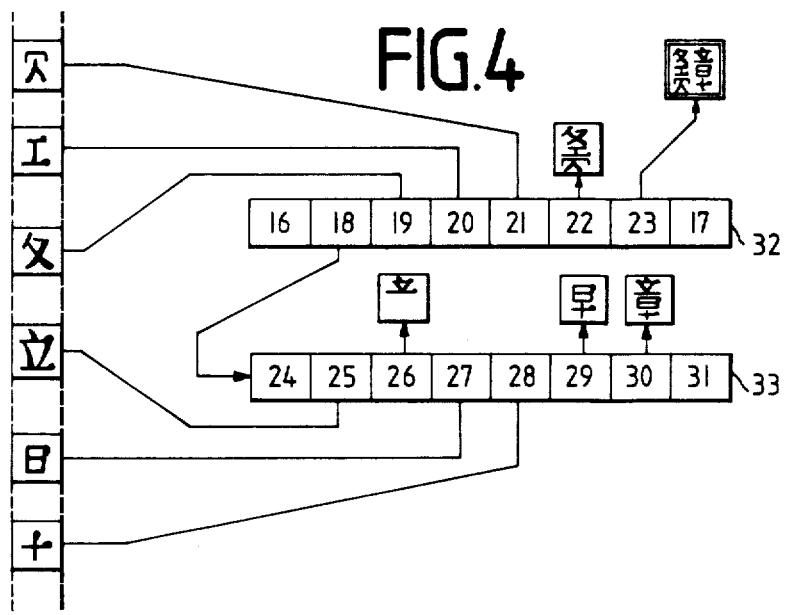
FIG. 4
FIG. 5
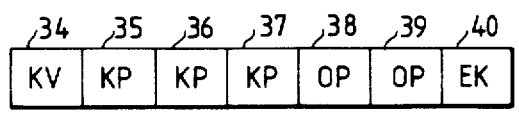

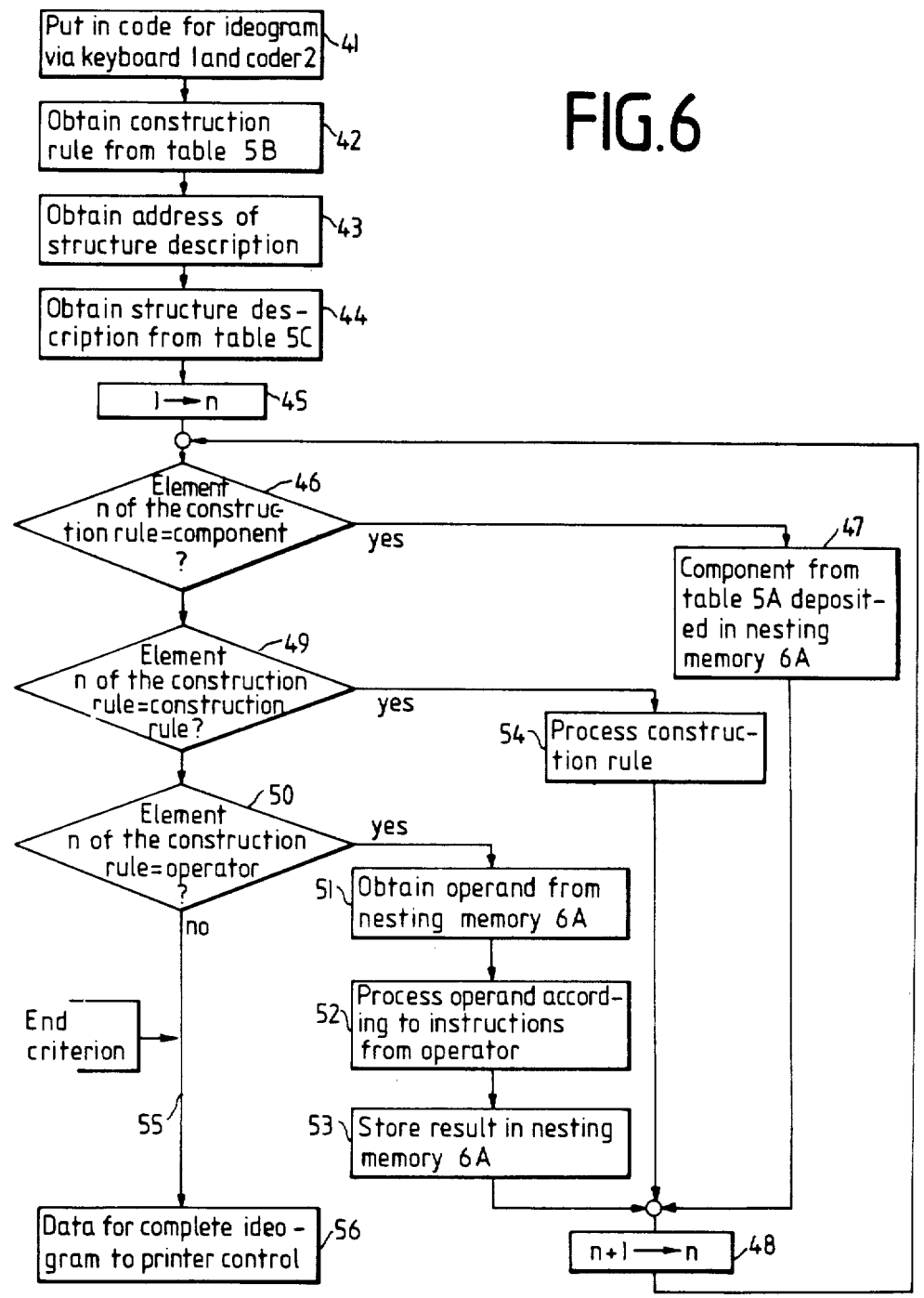

METHOD FOR CONSTRUCTION AND DISPLAY OF IDEOGRAPHIC CHARACTERS

BACKGROUND OF THE INVENTION

The present invention relates to a method for constructing ideographic characters, e.g. Chinese characters, and comparable graphic designs.

In order to permit machine processing of characters for display by means of a printer or for projection on a video screen, the data for the characters must be contained in a character memory or character generator of the machine. For alphabetic scripts this requires only a small amount of memory space. But the memory space becomes quite a problem when ideographic scripts are to be processed which employ an extensive supply of characters. In the case of Chinese, this would mean that up to 50,000 ideograms would have to be stored in the character generator. Even if the system were limited to the supply of the simplified Chinese telegraph code, about 10,000 ideograms would have to be stored. Moreover, some of these ideograms form complex graphic designs, particularly if the result is to be a display of great accuracy and resolution, and in order to be represented they require a large number of data bits.

To solve this problem, the article "Keyboard Method for Composing Chinese Characters" by E. F. Yhap in IBM Journal of Research Development, January, 1975, pages 60–67, discloses a method according to which the ideographic characters are separated into components and stored, the components preferably being formed by radicals, which are elmentary components of Chinese characters used to form more complex characters. Since the selected components are the basic modules for constructing the ideographic characters, a large supply of characters can be contained in a character generator designed in this way involving a comparatively small number of stored components.

However, the read-out of the ideograms by way of a keyboard, as disclosed in this publication, is a complicated process which requires expensive training of the operator and high concentration during work. Each ideographic character requires the actuation of a varying number of keys, which can be quite large, depending on its complexity, so as to assemble the individual components, define their respective position within the area occupied by the ideographic character and their respective size. In order to make the correct construction of each ideographic character controllable, a single character display is provided on which the step-by-step assembly can be monitored.

To simplify operation of the construction of ideograms by machine, European Patent Application No. 0,009,662, published Apr. 16th, 1980, proposes to select the character components in such a manner that each ideogram can be assembled of only two components which are of identical size in one direction. Two sets of data are stored of which one contains position information for the components within the different ideograms. A playback instruction for a certain ideogram has the result that the two associated components are taken from the first set of data and the position information is taken from the second set of data and the ideogram is composed in a character raster memory.

Although this solution simplifies the operating function, the requirement for memory space is again very large. Since each ideogram must be formed of only two components, most of the components are still very complex and each one of the components can be used only for very few ideograms. Therefore, very many components must be stored and the set of position information data to be stored also is very large.

SUMMARY OF THE INVENTION

It is an object of the present invention to provide a method of the above-mentioned type which can be realized with a character generator of smaller memory capacity without resulting in a complicated operation of a machine employing this concept.

The above and other objects are accomplished by the present invention wherein a method is provided for constructing ideographic characters by means of a character generator and displaying such characters within a standard character area of a display device coupled to the character generator. The method includes storing data in the character generator corresponding to (a) character components used for forming the ideographic characters of a given supply of ideographic characters, (b) information regarding the position within the standard character area of the ones of the character components associated with each respective ideographic character of the given supply, and (c) information regarding the size of the ones of the character components associated with each respective ideographic character of the given supply. Also included are the steps of feeding a character code into the character generator to identify the ideographic character to be displayed, and emitting display control signals in accordance with the stored data relating to the ideographic character identified by the character code fed in by the feeding step for displaying the associated character components arranged in the standard character area of the display device according to the stored position information and adjusted in the horizontal and/or vertical direction in accordance with the stored size information.

The advantages of the invention are that, in particular, due to the compression information associated with the ideographic characters, it is possible to subdivide the ideographic characters in the supply of characters into smaller and simpler character components which can be used for very many different ideographic characters. This results in a considerable reduction of the number of character components to be stored so that a character generator having a smaller storage capacity can be used. Because neither position information nor compression information need be fed in separately during input of the character code, operation is also simpler and easier to learn.

The possibility of even further reducing the necessary storage capacity results if the subdivision into character components is carried out in such a manner that complete ideographic characters can be produced not only by arranging the components next to or above one another but also by covering one component with another. The increased number of possible arrangements provided by such superposition of character components permits a further reduction of the number of character components to be stored.

If, in addition to compression information, information about the degree of compression is also stored, the components stored in a standard size can be used in even more different ways and the number of stored components, and thus the storage capacity, can be further reduced.

A further advantageous feature of the invention is the provision of a construction rule which is set up for each ideographic character in the available supply of characters. This rule can be called up directly by the respective character code so that the complete information for forming the character is available immediately. Construction rule operands indicate the components to be used and operator elements within the construction rules give instructions for the position of the respective components in the complete ideographic character. As a construction rule is processed, the respective character components are arranged in the correct positions without the need for further control data. The storage capacity required in the prior art solutions is thus reduced as no separate memory regions for character components and position information are required which would have to be addressed separately during character code input. The internal control sequences in the character generator for the assembly of ideographic characters of comparable graphic designs in the character generator is accordingly very simple.

In another avantageous feature additional storage capacity is saved wherein some of the operands of construction rules for complicated ideograms comprise addresses for construction rules of simpler ideograms which are suitable as components of the more complicated ideogram. With such nesting, which may possibly lead into even further planes, it is possible to keep construction rules for complicated ideograms as short as possible.

In a further advantageous aspect of the invention the construction rules provided for the formation of the ideographic characters can be made especially short. In order to be able to distinguish between the different successive types of elements (operand, operators, etc.) in a construction rule and to appropriately evaluate their data, it is necessary in principle to provide each element with additional identifying information. Without such additional information the sequence and number of different elements always would have to be provided in the same rigid structure, independent of the actually required length of the respective construction rule for ideograms of varying complexity. This problem is avoided and the storage capacity required for this purpose is further reduced in that one aspect of the present invention is to provide a single structure description within each construction rule that defines the sequence and number of elements peculiar to that particular construction rule.

Advantage is also taken of the fact that the structure descriptions occurring in the construction rules are generally the same for several construction rules. By depositing the structure descriptions in a table, only the address of the structure description is required to be in the construction rule itself. The storage capacity therefore can be reduced even further.

According to a further advantageous aspect of the invention the construction rules are processed in steps so that only a small intermediate storage requirement exists. Since each partial operation replaces the operands processed therein as well as the operator by a new, modified operand, there remains in effect, despite the step-wise processing, the same processing principle for the entire construction rule. In this way the internal control sequence may be of very simple design and assure fast operation.

A further reduced storage capacity and even shorter processing times result if, instead of the character component data, only addresses are manipulated as operands. These addresses, under which component data are stored, have fewer digits than the complete data and therefore require less storage space and shorter transmission times.

The operating sequence for the construction rules makes it possible simply to provide a nesting memory as the intermediate store wherein the first stored data are removed last. It is then possible to file the operands in sequences according to their sequence in the construction rule, remove them for processing when the associated operator is present and to store the results again in the nesting memory without requiring special control and addressing efforts.

Further advantages will become evident from the embodiment of the invention which will be explained below with the aid of the drawing figures.

BRIEF DESCRIPTION OF THE DRAWINGS

FIG. 3 shows variations of a character component.

FIG. 4 illustrates a construction rule according to the invention.

FIG. 5 is a description of the structure of the construction rule of FIG. 4.

FIG. 6 is a flow chart for carrying out the method of the invention.

DESCRIPTION OF THE PREFERRED EMBODIMENTS

Figure 1:
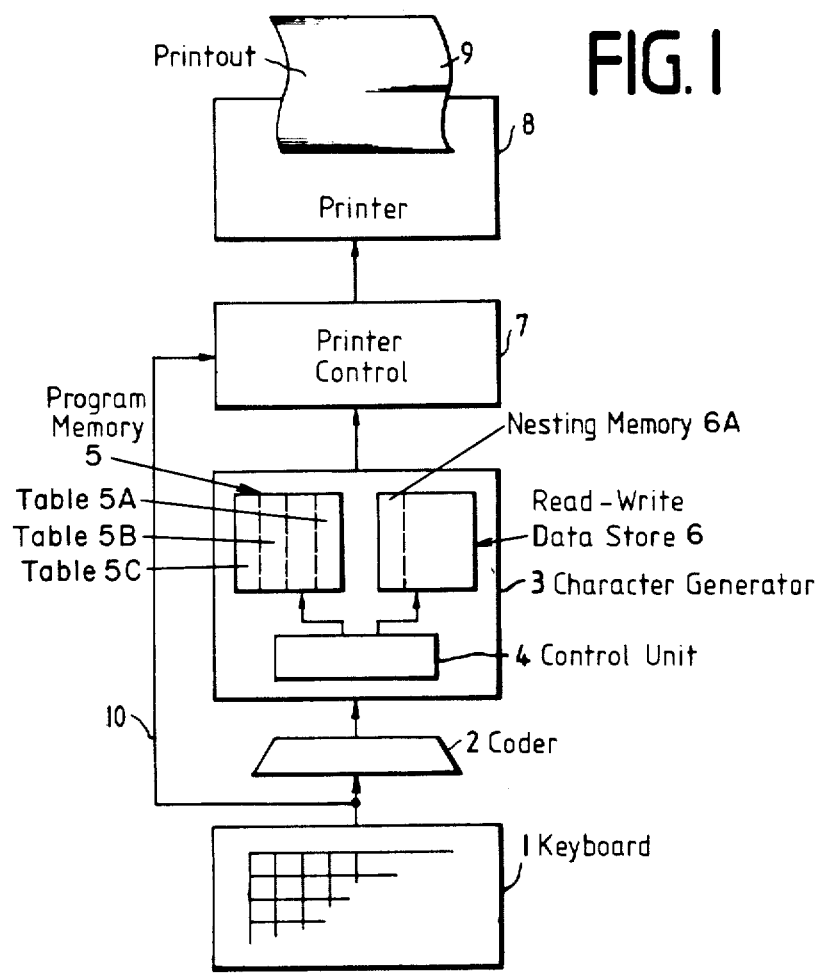
FIG. 1 is a circuit block diagram of a machine used for displaying Chinese characters according to the method of the invention.

In the simplified circuit block diagram of Figure 1, a machine used for displaying Chinese characters is shown including the functional blocks required to understand the method of the invention. A character code associated with the ideogram to be displayed is put in via a keyboard 1 which corresponds in its number of keys and their arrangment to the keyboards customarily employed for European languages. The character supply that can be reproduced with the machine is based on, for example, the Zhi code, according to which 1 to 4 keys need be depressed for each Chinese character. The resulting keyboard signal which represents one character is converted in a coder 2 into the input code for a character generator 3 which may use the Chinese telegraph code. The Zhi code as well as the Chinese telegraph code are not absolute requirements for the present invention. Any code is suitable with which an unambiguous input criterion can be produced by means of the keyboard for each complete ideographic character of the supply of characters, with the criterion being evaluated, possibly after suitable conversion, by the character generator. The Zhi code, also known as OSCO (Onsight-Code), has been developed by Dr. Zhi Ping-yi and is disclosed in the publication "JIAN ZI SHI MA" HAN ZI BIAN MA FANG FA SIRI (Coding Method for Chinese Characters) by Zhi Ping-yi, Shanghai Instrument Research Institute, Shanghai 1979. The Chinese telegraph code is disclosed in the publication "BIAO JUN DIAN MA BEN" (Standard Telegraph Code Book) by Commercial Press, HONG KONG, 1972. The function of coder 2 is performed by a microcomputer using a stored table for conversion of the keyboard signals into binary values corresponding to the Chinese telegraph code and representing the input Chinese character. The keyboard signals cause adressing of the respective contents of the table and readout of the binary values to character generator 3.

Character generator 3 includes a control unit 4, a program memory 5 for the function program for character generator 3 and a read-write data store 6 having a nesting memory 6A. Program memory 5, as more fully explained hereinafter, stores a Table 5A which comprises component data, a table 5B which comprises construction rules data and a Table 5C which comprises structure description data. Character generator 3 is formed by a microcomputer. The output signals of character generator 3 are evaluated in a printer control 7, which is likewise formed by a microcomputer, for actuation of a dot matrix printer 8 which displays the input character on printout 9.

Matrix printer 8 preferably displays each character within a standard character area formed, for example, of a dot matrix field of 24×24 dots, of which only the dots forming the respective character are recorded on the printout. An ink jet printer comprising 24 nozzles arranged in a row, which are moved across the standard character area in 24 horizontal steps, has been found to be particularly advantageous for this purpose. Matrix printers with the foregoing characteristics are well known and are commercially available.

Signals fed in through keyboard 1, which need not be processed by character generator 3 are fed directly to printer control 7 over a different signal path 10. Such signals are, for instance, command signals for character spacing, line spacing, carriage return, tabulating operations etc.

Instead of printer control 7 and printer 8, a dot matrix screen with associated actuation circuitry may be provided in a known manner or the machine may be equipped with a display device for one or a plurality of characters in addition to the printer.

Character generator 3 may be part of printer control 7 so that its microcomputer, likewise including a data store, a program store and a control unit, also performs the function of character generator 3.

The ideographic characters which can be produced by the machine are divided into character components. Character component data are stored in program store 5 of character generator 3 which selectively enables printer 8 to print the character components. The characters are divided into components in such a manner that these components can be used in as many different characters as possible; thus, a relatively small supply of components is required to form a considerably larger number of characters. Several components may also, by themselves, represent characters with independent meaning.

It is suitable for the components to include, for example, the majority of the radicals and variations thereof, as well as other character components suitable for the intended purpose. The stored component data represent character components in a size which corresponds to the largest size occurring in the character supply.

To form complete characters, many components are required not only in their standard size but also in smaller configurations and must be arranged at a defined location in the respective standard character area. It is therefore provided that the stored components can also be printed on a smaller scale while simultaneously considering position information within the standard character area. The position information may provide not only that the character components are to be arranged next to or above one another, but also, if necessary, so that one overlays the other. This applies for compressed components as well as for those components which are small compared to the standard character area and have different positions in different characters.

Figure 2:
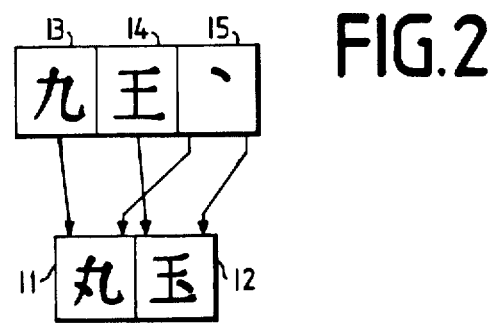
FIG. 2 shows two ideographic characters and their components.

FIG. 2 shows the creation of two characters 11, 12 which are constructed from three character components 13, 14, 15. No compression is required here, but component 15 is disposed at different locations in the two characters 11 and 12, corresponding to respective position information.

Compression occurs according to fixed rules which are also contained in the program memory 5. The compression rules contain superposition instructions for the respective components, according to which selected parts of a component or components are shifted over one another. Particular care must be taken that no significant graphic information is lost and no unproportionally thick lines or parts of the character result. In the 24×24 matrix printer on which the present embodiment is based, compression can be effected by suppressing the horizontal stepping movement of the vertical row of nozzles at selected points to produce horizontal compression and by suppressing the line shift during actuation of the matrix lines at selected locations for vertical compression. Other measures are also conceivable to produce compression, for example, a reduced horizontal step. Preferably, the suppression of stepping movements and line shifts is performed by control unit 4 of character generator, which superposes the signals of the component data in such a manner that the output data of character generator 3 are compressed prior to being fed into printer control 7. It is also possible, though less desirable, to use printer control 7 to perform character compression.

With the use of the superposition process in character generator 3 it is also possible to consider different degrees of compression so that the character components for various characters can be printed in different sizes. In a 24×24 dot matrix printer, the horizontal and/or the vertical compression could take place in 1/24 graduations of the standard character area.

To demonstrate character compression, FIG. 3 shows various compressed designs: FIG. 3-A shows the standard character size, which corresponds to the uncompressed stored form; FIG. 3-B shows horizontal compression to ⅔; FIG. 3-C shows vertical compression to ½; FIG. 3-D shows horizontal compression to ½ and vertical compression to ½; FIG. 3-E shows vertical compression to ½ and horizontal compression to ⅔; and FIG. 3-F shows horizontal compression to ½ and vertical compression to ⅔.

A construction rule is provided for the assembly of each character in the supply of characters. These construction rules are stored in the form of addressable data entries in Table 5B in program memory 5 of character generator 3. Actuation of one to four keys on keyboard 1 is required to address one character which causes the associated construction rules to be called up. The processing of such rules is controlled by control unit 4.

FIG. 4 illustrates how two construction rules 32, 33 operate to combine character components to form a more complex character. Construction rules 32, 33 comprise a plurality of different elements 16–31. Each rule includes, respectively, starting information 16, 24; a final criterion 17, 31; a number of operands 18–21 and 25, 27, 28; and a number of operators 22, 23 and 26, 29, 30. The number of operands and operators depends on the degree of complexity of the character to be formed.

Operands 18-21 and 25, 27, 28 comprise the data of construction rules 32, 33 which define the graphic structure of the character components; and operators 22, 23 and 26, 29, 30 comprise the data which define the corresponding position information and/or compression information of the character components for the ideographic character being formed.

An operand can be formed by another construction rule thus making a character described by the other construction rule a component of the character covered by the first construction rule. This occurs in FIG. 4 in connection with operand 18 (of construction rule 32) which is formed by construction rule 33. In this way it is possible, without difficulty, to make further nested combinations in that, for example, another construction rule which is used as an operand, contains in itself a third construction rule as operand and so on.

To further limit the size of the construction rules and with it the requirement for storage capacity, addresses under which component data are stored, rather than component data themselves, may be used as operands in the construction rules. In this case, the component data are stored in the form of addressable data entries in a table 5A in program memory 5 of character generator 3.

Because the characters in the supply of characters are of different complexity, construction rules are also of different lengths, and have different sequences of the various operands and operators, i.e. the construction rules have different structures. The construction rules are classified according to their respective structures and a description of each type of structure is contained in the form of addressable data entries in a further table 5C stored in program memory 5 of character generator 3.

The starting informations preceding the construction rules such as elements 16, 24 in construction rules 32, 33, respectively, each comprise an address under which the applicable structure description is stored. A structure description contains information of the type of data involved in the respective successive elements (i.e. operands, operators or a final criterion) of the construction rule.

Depending on the type and complexity of the given supply of characters and the processing sequence in control unit 4 of character generator 3, other information may also be contained in the structure descriptions. For example, it is possible to group operands having certain features in common and operators which produce some of the same control affects during evaluations, to consider these groups as different elements in the construction rule and to identify them by separate information in the structure description. Other information may also be contained in the structure description, if required. The data in the successive elements of a construction rule are treated and evaluated during their processing by control unit 4 according to the information contained in the structure description.

FIG. 5 shows a structure description 34-40 applicable to construction rule 32 shown in FIG. 4. The address of this structure description would be contained in the first element 16 of construction rule 32. Element KV in first positon 34 of structure description 34-40 indicates to control unit 4 of character generator 3 that the first element 18 of construction rule 32 is an operand produced by a different construciton rule, namely, construction rule 33; the next three positons 35, 36, 37 indicate that the second, third and fourth elements 19, 20, 21, respectively, relate to operands (type of element KP), the component data of which is stored in table 5A; positions 38 and 39 indicate that the fifth and sixth elements 22, 23, respectively, of construction rule 32 each relate to an operator (type of element OP); and the last position 40 indicates that construction rule 32 has the final criterion as its last element 17 (type of element EK).

Instead of providing an address in the starting information of a construction rule to reference a structure description listed in structure description table 5C as described above, the structure description itself can be used as the starting information in the construction rule. Also, the information must not necessarily be disposed at the beginning of a construction rule.

The internal sequence for the construction of an ideographic character will now be described with the aid of the flow diagram of FIG. 6 as it relates to the circuit block diagram illustrated in FIG. 1.

The ideographic character is put in at 41 by actuation of one to four keys on keyboard 1, arranged according to the Zhi code, and keyboard signals are converted in coder 2 to the Chinese telegraph code. The construction rule for the character is obtained at 42 from table 5B of the construction rules in program memory 5. At 43 the starting information of the construction rule is analyzed by control unit 4 to obtain the address of the structure description applicable for the construction rule, and at 44 the structure description is obtained from the table of structure descriptions 5C in program memory 5. Control unit 4 now has available necessary information to evaluate the subsequent elements of the construction rule. A counter in control unit 4 is changed at 45 with a "1" to note that the first element in the construction rule after the starting information is ready for processing. The elements are processed one at a time in sequence according to steps 46 to 56 of the flow chart.

An interrogation 46 is first performed to determine whether the element being processed is an address for a character component. If an affirmative answer results, the data of the associated character component are obtained from component table 5A in program memory 5 and are deposited at 47 in nesting memory 6A. Nesting memory 6A comprises part of data memory 6 and is controlled according to the first-in last-out principle. This concludes the processing of that element of the construction rule. The counter then is raised one position at 48 and the next element is examined.

If interrogation 46 produces a negative answer, interrogation 49 is conducted to indicate whether the element is an address for another construction rule. Control unit 4 interprets an affirmative answer to interrogation 49 as an instruction for processing the other construction at 54 prior to processing the next element of the current construction rule. The data of the character resulting from the other construction rule are stored, based on the last operation, as an operand in nesting memory 6A; and the end criterion of the other construction rule is interpreted as a return instruction to the higher order construction rule and the counter is again raised by one at 48.

If interrogations 46 and 49 both produce a negative answer, interrogation 50 next is conducted to indicate whether the element is an operator. If so, the operands desposited in nesting memory 6A are read out at 51 and are processed at 52 according to the instructions of the operator. The processing result, i.e. a modified character component, possibly composed of a plurality of character components, is stored at 53 as an operand in nesting memory 6A. The operator may here also contain information about how many of the operands stored in nesting memory 6A are to be used for processing. The counter is again raised by "1" at 48, and the next following element of the construction rule is examined.

If all three interrogations 46, 49, 50 produce a negative answer the element at 55 of the construction rule is an end criterion. This terminates the processing of the construction rule. The data stored in nesting memory 6A, at this point represent the complete ideographic character and are discharged at 56 to printer control 7 for display.

The above-described sequence shows that operands can be formed of individual character components as well as of modified character components obtained from preceding operations, or of a plurality of components which can then be processed further according to further operators.

With the foregoing as background, construction rules 32, 33 for forming the ideographic character shown in FIG. 4 will now be described. After the structure description in or represented by element 16 has been evaluated, the first operand 18 of construction rule 32 is processed. Operand 18 represents an instruction to process the other construction rule 33. The structure description in or represented by element 24 of construction rule 33 is first evaluated and then operand 25 is stored in nesting memory 6A. Operator 26 causes removal of operand 25 from nesting memory 6A, vertical compression to ⅓ toward the top and renewed deposition in nesting memory 6A. Operands 27 and 28 are then stored successively in nesting memory 6A. Operator 29 causes their removal, vertical compression to ⅓, arrangement of one above the other and storage in nesting memory 6A. Operator 30 causes removal of the two stored operands, vertical compression of the first removed operand to ⅔ toward the bottom, arrangement of the two operands, one above the other, and renewed storage in nesting memory 6A. End criterion 31 causes return to the higher order construction rule 32. Here, operands 19, 20 and 21 are read into nesting memory 6A; operator 22, as soon as it is ready for processing, causes removal of the three operands 19, 20 and 21, vertical compression to ⅓ and arrangement of one above the other as well as storage of the result in nesting memory 6A. The data of two character components combined of compressed components are now present as operands in nesting memory 6A.

The last operator 23 causes their removal, horizontal compression of both operands to ½, arrangement next to one another and storage in nesting memory 6A. The last following end criterion 17 causes termination of the operations. The stored data in nesting memory 6A represent the finished ideographic character and can be transmitted to printer control 7.

Although in the above-described sequence, the data of the operands are stored in the nesting memory 6A, it is of course also possible to store only addresses under which character components, modified components, combined components and finished characters are stored at another location in data memory 6. Control unit 4 must then be designed so that after removal of an address, the associated data are called out from data memory 6 and after processing are assigned a memory location with a new address.

Without deviating from the basic idea of the invention, other ideographic types of script instead of the Chinese script can be processed in the same described manner, and other graphic representations can be made in the same way. The output of the ideographic characters or graphics may also occur, for example, by means of vectors instead of dot matrixes. Likewise, the complexity of the stored character components may be reduced to simple lines of different shape and inclination.

It will be understood that the above description of the present invention is susceptible to various modifications, changes and adaptations, and the same are intended to be comprehended within the meaning and range of equivalents of the appended claims.

What is claimed is:

1. In a method for constructing ideographic characters by means of a character generator and displaying such characters with the use of a display device coupled to the character generator, the display device having a standard character area for the display of ideographic characters, said method comprising:

storing in the character generator addressable data defining character components used for forming ideographic characters of a given set of ideographic characters, and addressable construction rules, each construction rule comprising a predetermined sequence of operands and operators which when processed in sequence define an ideographic character, the operands including addresses for directly accessing data defining character components of the ideographic characters and addresses for other construction rules which when processed define character components of the ideographic characters, and the operators comprising instructions for the desired position and size of the character components identified by the operands;

feeding a character code into the character generator for selecting a construction rule corresponding with a selected ideographic character to be displayed; and sequentially processing the predetermined sequence of operands and operators of the selected construction rule, said processing including:

(1) determining, for each operand as it is reached in the sequence for processing, whether such operand is an address for directly accessing data defining a character component or an address for another construction rule;

(2) accessing the data defining a character component if the operand comprises an address for directly accessing data;

(3) immediately processing the other construction rule, if the operand comprises an address for such other construction rule, to produce an ideographic character defined by such other construction rule, such ideographic character constituting a character component of the selected construction rule; and (4) processing the remainder of the selected construction rule by manipulating and storing the respective character components produced by steps (2) and (3) according to the size and position information contained in the operators of the remainder of the selected construction; and emitting display control signals by reading out the stored character components for actuating the display device for displaying the character components identified by the operands in the standard character area of the display device according to the position and size information contained in the instructions of the operators.

2. A method as defined in claim 1 wherein the instructions for size comprise instructions for displaying character components in a reduced size in the desired position within the standard character area of the display device.

3. A method as defined in claim 1, including the steps of:
dividing the ideographic characters of the given set of ideographic characters into character components such that ideographic characters can be displayed which are assembled of one or a plurality of character components arranged above and/or next to one another and/or overlaying one another;
wherein said stored character components comprise the components resulting from said dividing step and the stored position instructions comprise instructions for those ideographic characters which are composed of a plurality of character components for arranging the character components to the right, left and/or at the top, bottom and/or in the center of the standard character area.

4. A method as defined in claim 1, wherein said instructions for size include information for scaling the size of character components and said emitting step includes emitting display control signals for displaying the character components in a size corresponding to the respective scaling information.

5. A method according to claim 4, wherein character components have defined regions with dimensions of length and width, and the stored instructions for size include superposition instructions according to which the width and/or length of the defined regions of a respective character component is reduced.

6. A method as defined in claim 5 wherein said processing step includes modifying the character component data contained in the character generator according to the stored instructions for size and said emitting step includes emitting control signals for the display of the modified character components for the ideographic character to be displayed.

7. A method as defined in claim 6 wherein the display device is a dot matrix display device and the control signals of said emitting step reduce the spacing of the matrix dots, at least in one direction, by an amount corresponding to the scaling information to thereby display compressed character components.

8. A method as defined in claim 6 wherein the display device is a dot matrix display device and the control signals of said emitting step reduce the number of the matrix dots, in at least one direction, by an amount corresponding to the scaling information to thereby display compressed character components.

9. A method as defined in claim 6 wherein the display device is a dot matrix display device and the controls of said emitting step superpose selected matrix lines and/or columns to thereby display character components corresponding to the scaling information.

10. A method as defined in claim 7, 8 or 9 wherein said dot matrix display device comprises a dot matrix printer.

11. A method as defined in claim 7, 8 or 9 wherein said dot matrix display device comprises a dot matrix screen.

12. A method according to claim 1 further including providing each construction rule with additional information indicating the individual sequence of operands and operators in the construction rule, and wherein said processing step further includes using the additional information to recognize and evaluate the data and instructions indicated by the operands and operators, respectively.

13. A method according to claim 12 further including the step of dividing operands and/or operators having the same control effects into groups and identifying such groups by separate information in the additional information of the respective construction rules.

14. A method as defined in claim 12 further including providing each construction rule with an end criterion element which identifies the end of the construction rule, and including each end criterion element in the additional information of each construction rule.

15. A method as defined in claim 12, further including the step of storing the individual sequences of operands and operators in the form of a table of addressable data entries in the character generator, and said providing step includes providing an address in the additional information under which the data entry of the respective sequence is stored.

16. A method according to claim 12 wherein said processing step includes modifying operand data according to the instructions constituting the operators, and using operand data modified by one operator as the operand for a subsequent operator in the sequence which produces still further modified operand data, whereby the last modified operand data of the processing sequence represents a complete ideographic character.

17. A method as defined in claim 16 further including placing each operand in the construction rule ahead of the associated operator which causes the processing of such operand, wherein the operator for processing operand data into the last operand, which includes the data for the complete ideographic character, is the last one of the operators in the construction rule.

18. A method as defined in claim 17 wherein the character generator includes a memory portion and said step of processing the selected construction rule further includes the steps of:
storing data identified by an operand in the memory portion until the next operator appears in the construction rule sequence;
reading such data out of the memory portion;
processing the data read out of the memory portion according to the instructions constituting such next operator to produce modified operand data; and
storing the modified operand data in the memory portion wherein the processing result of the last operator of the construction rule forms the data of the complete ideographic character.

19. A method as defined in claim 18 wherein:
the operand addresses are stored in the memory portion and the data defining the character components are stored in a table under the respective operand addresses;
said reading step includes reading out of the memory portion the operand addresses associated with the next operator of the construction rule sequence to be processed after the occurrence of such next operator; and
said step of processing the selected construction rule further includes the steps of:
removing the data from the table which is stored under the operand addresses read out of the memory portion and depositing such data in a data memory under a new address; and
storing the new address in the memory portion.

* * * * *